Patented Dec. 25, 1923.

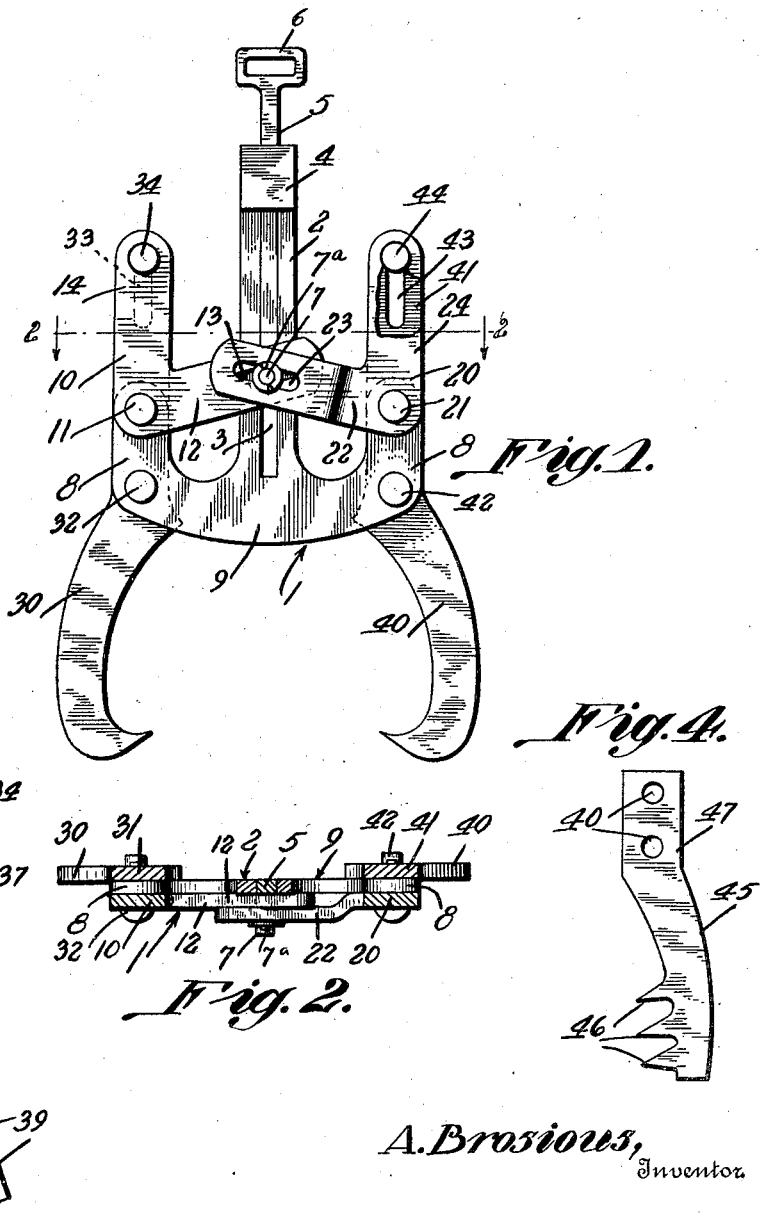

1,478,727

UNITED STATES PATENT OFFICE.

ADAM BROSIOUS, OF SUNBURY, PENNSYLVANIA.

SAFETY GRAB HOOK.

Application filed March 12, 1923. Serial No. 624,576.

*To all whom it may concern:*

Be it known that I, ADAM BROSIOUS, a citizen of the United States, residing at Sunbury, in the county of Northumberland and State of Pennsylvania, have invented a new and useful Safety Grab Hook, of which the following is a specification.

This invention relates to grab hooks or tongs for use in lifting various objects by either hand or machinery.

The object of the invention is to so construct a device of this character, that the jaws thereof will reliably grasp the object to be lifted and insure its being securely held until lowered and released, thus avoiding all danger of the object being accidentally dropped while being raised or lowered, rendering the use of the hook absolutely safe.

Another object is to provide a hook of this character having interchangeable jaws to adapt it for use with objects of varying shapes.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a front elevation of a hook embodying one form of this invention.

Fig. 2 is a horizontal section taken on the line 2—2 of Fig. 1.

Fig. 3 is a side elevation of one member of a sectional gripping jaw capable of use in the device constituting this invention, and Fig. 4 is a similar view of the cooperating section.

In the embodiment illustrated, a body member 1 is shown which is substantially inverted T-shaped in form, the shank 2 thereof being longitudinally slotted as shown at 3 and provided at its free end with an enlargement 4 having a bore extending longitudinally therethrough in which operates a sliding bar 5. This bar 5 has a hand grip 6 at its outer end and at its inner end is equipped with a laterally extending pin 7 which projects through the slot 3 and is designed to actuate bell crank levers 10 and 20 hereinafter described.

The head 9 of the body member 1 has inwardly extending parallel arms 8 which are also arranged parallel with the shank 2 of said body and on the free ends of which are fulcrumed the bell cranks 10 and 20 as shown at 11 and 21.

These bell cranks 10 and 20 have their arms 12 and 22 extended inwardly toward each other and slotted longitudinally at their ends as shown at 13 and 23. These slotted ends are arranged in lapping relation and the pin 7 extends through the slots therein and is secured by a suitable fastener here shown in the form of a cotter pin $7^a$, although obviously a nut or other retainer may be used.

The arms 14 and 24 of the bell cranks overlie the shanks 31 and 41 of gripping jaws 30 and 40 which are fulcrumed at the outer corners of the head 9 as shown at 32 and 42. These shanks have their rear ends longitudinally slotted as shown at 33 and 43 in which operate connecting bolts 34 and 44 which unite said ends to the rear ends of the arms 14 and 24 of the bell cranks.

The gripping jaws 30 and 40 which project forwardly beyond the head 9 of the body 1 may be of any suitable or desired shape according to the object to be lifted thereby. In Fig. 1, these jaws are in the form of ice hooks.

In Fig. 3 the shank 35 is shown designed to be fulcrumed at the angle 36 thereof to one corner of the head 9 of body 1 to take the place of the shank shown connected in Fig. 1. This shank 35 is slotted at 37 at its outer end to the inner end thereof beyond its fulcrum point and bent at an obtuse angle to provide an attaching arm 38 equipped with longitudinally spaced bolt holes 39, with similar holes in a detachable jaw to be used in connection therewith. It is to be understood that any form of jaw may be employed in connection with the shank 35 and in Fig. 4 a jaw 45 is shown such as is ordinarily used in handling bales of hay and the like which is made arcuate in form and equipped on its inner face with gripping teeth 46. This jaw 45 has a rectangular rear extension 47 provided with longitudinally spaced apertures 40 designed to register with the apertures 39 in the arm 38 of the shank 35 and to be secured thereto by bolts so that when desired the jaw 45 may be removed and another substituted.

In the use of this grab hook, the lowering thereof into contact with the object to be raised will cause the jaws 30 and 40 to spread and receive between them the object in connection with which the device is to be used. An upward pull of the bar 5 will move the arms 12 and 22 of the bell cranks 10 and 20 causing them to rock on their fulcrums and the arms 14 and 24 thereof to swing outwardly away from each other carrying with them the shanks 31 and 41 of the gripping jaws 30 and 40 which operate to move these jaws toward each other causing them to clampingly engage the object to be lifted. A continued pull exerted on the bar 5 will operate to hold these jaws in engaged position and to cause them to more tightly grasp the object between them.

To release the article gripped by the jaws 30 and 40, all that is necessary is to lower it into contact with the ground or other supporting surface and to relieve the pull on the bar 5 when the jaws 30 and 40 will swing outwardly and permit it to be removed.

Various changes in the form, shape, proportion and other minor details of construction may be made without departing from the spirit or sacrificing any of the advantages of the claimed invention.

I claim:—

1. A safety grab hook comprising a body member, gripping jaws fulcrumed on said body in spaced relation, bell cranks fulcrumed on said body above the fulcrums of said jaws and having the free end of one arm connected with said jaws, and means connected with the other arm of said bell cranks operable by a pull exerted thereon to close said jaws.

2. A safety grab hook comprising a body member, gripping jaws fulcrumed on said body in spaced relation, bell cranks fulcrumed on said body and connected with said jaws, a bar slidably connected with said bell cranks whereby the movement thereof in one direction will close said jaws and in the other direction will open them.

3. A safety grab hook comprising a substantially T-shaped body member having a longitudinally slotted shank, bell cranks fulcrumed on the arms of said body and having one arm extended inwardly and the other rearwardly, inwardly extending arms being longitudinally slotted and arranged in lapping relation, a bar slidable in the shank of said T-shaped member and having a pin extending through the slot therein and through the slots in said bell cranks, and gripping jaws fulcrumed on said body and connected with the other arms of said bell cranks.

In testimony that I claim the foregoing as my own, I have hereto affixed my signature in the presence of two witnesses.

ADAM BROSIOUS.

Witnesses:
CHAS P. LAMON,
CHAS. BROSIOUS.